United States Patent [19]

Grant

[11] 4,212,427

[45] Jul. 15, 1980

[54] GATE ATTACHMENT FOR MANURE SPREADER

[75] Inventor: Rodger B. Grant, Port Colborne, Canada

[73] Assignee: Deere & Company, Moline, Ill.

[21] Appl. No.: 955,020

[22] Filed: Oct. 26, 1978

[51] Int. Cl.² .............................................. A01C 3/06
[52] U.S. Cl. .................................. 239/676; 222/504; 222/556; 239/228; 239/679; 296/56
[58] Field of Search .............. 239/676, 679, 680, 288; 296/56, 98, 100; 212/39 P; 222/504, 556, 624, 317; 414/519, 694

[56] References Cited

U.S. PATENT DOCUMENTS

| | | | |
|---|---|---|---|
| 3,253,834 | 5/1966 | Bing et al. | 239/676 |
| 3,549,199 | 12/1970 | Sibley | 296/100 |
| 3,830,542 | 8/1974 | Lablanche | 296/56 |
| 3,904,049 | 9/1975 | Prahst | 296/56 |
| 4,072,272 | 2/1978 | Harder | 239/676 |

Primary Examiner—Bruce H. Stoner, Jr.
Assistant Examiner—Michael J. Forman

[57] ABSTRACT

An end gate attachment for use on a manure spreader in which the end gate has forwardly extending arms positioned over the upper edges of the manure spreader box. The arms are hollow and open downwardly so as to encompass hydraulic cylinders that extend between the upper edges of the box and the arms for purposes of raising and lowering the arms and the gate.

4 Claims, 2 Drawing Figures

GATE ATTACHMENT FOR MANURE SPREADER

BACKGROUND OF THE INVENTION

It is heretofore been known to provide gates on manure spreaders that fit forwardly of the beater mechanism and prevent material within the box from moving out the open rear end of the spreader box. It has also been known to provide such gates that are mounted on fore-and-aft extending arms fixed to the upper edges of the manure spreader box and hydraulically operated to raise and lower the arms along with the gate so as to move the gate in and out of material-blocking position with respect to the open rear end. In many such arrangements, the hydraulic cylinders are mounted on the sides of the spreaders and a bell crank connection is provided in conjunction with the lift arms for the gate so that as the cylinder extends and retracts the arms and the gate move correspondingly.

One of the general problems that exists with such an arrangement of hydraulic cylinders is that damage may occur to the cylinders both due to the rust and corrosion caused by material that is contained in the spreader box and due to the normal type loading of the spreader box. In many instances, power loaders are used to move manure from a barnyard into the box. The power loaders generally are composed of a pair of lift arms mounted on opposite sides of a tractor and a bucket that is positioned forwardly of the tractor. The lift arms are raised and lowered and manure is scraped into the bucket. The bucket is then raised to a level above the spreader box and the material in the bucket is dumped into the box. Ofter times the area in which the spreader and loader is being used is rather confined. Also, in many instances, the visibility of the tractor operator that is loading the spreader is blocked by the superstructure of the power loader and consequently damage accidentally occurs to the sides of the spreader box and in many instances contact is made between the loader and the hydraulic cylinders that operate the tailgates thereby causing damage to the cylinders. Logs, stones and other heavy material may fall from the spreader or loader bucket to cause additional damage to the gate cylinders.

SUMMARY OF THE INVENTION

With the above in mind, it is the primary purpose of the present invention to utilize a power operated gate on the rear of a spreader and forward of the beater mechanism which is operated to be raised and lowered by hydraulic cylinders. Incorporated in the design of the gate is a pair of lift arms that are hollow inside and upon the arms and the gate being in their down position serve to cover and protect the hydraulic cylinders that lift the gate.

More specifically, it is the object of the present invention to provide an end gate attachment for a conventional type spreader composed of a pair of fore-and-aft extending and downwardly opening U-shaped channel members that fit over the respective upper edges of a conventional spreader and which may be fixedly but detachably connected thereto. The channels carry on their upper surfaces a pair of hydraulic cylinders that extend forwardly for attachment to the lift arms of a gate structure. The lift arms are pivotally mounted on the forward ends of the channel members and extend rearwardly from their pivotal connections. The hydraulic cylinders are connected to the lift arms at points that are radially offset from the pivotal connection of the lift arms to the channels. The lift arms are also of U-shaped channel-type structures that open downwardly. The lower edges of the arms are horizontal when the gate is down and fit closely adjacent the upper surfaces of the two channel members. The walls of the respective lift arms are spaced transversely apart so as to encompass the hydraulic cylinder as it is raised and lowered. Thus, when the arms are in their down position, the lower surface is generally closed by the channels and the hydraulic cylinders are completely covered by the lift arms.

DESCRIPTION OF THE PREFERRED EMBODIMENT

Figure 1:
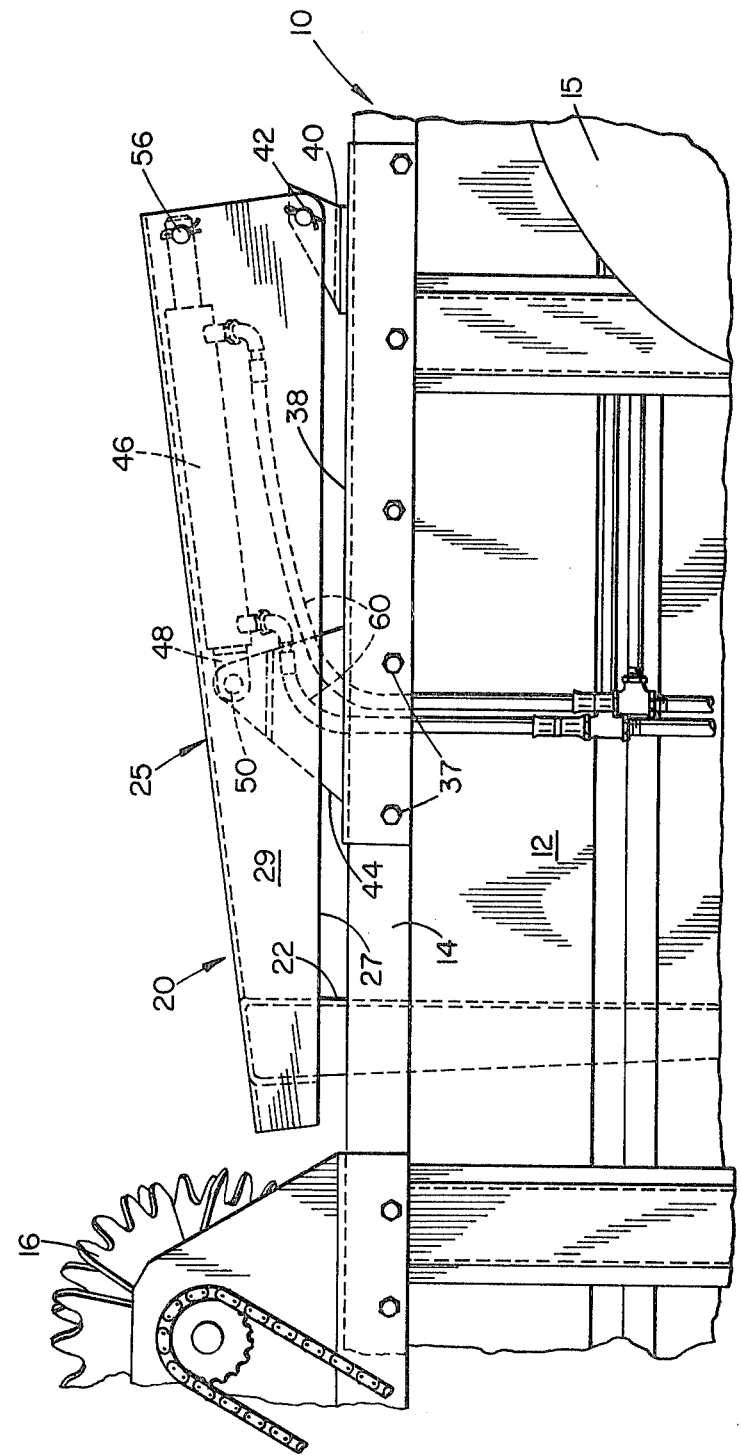
FIG. 1 is a side view of a portion of a manure spreader using the present invention.

Referring now to the drawings, there is provided a spreader box, indicated in its entirety by the reference numeral 10, having a floor 11 and a pair of upright sides 12, 13 extending fore-and-aft and extending upwardly from opposite longitudinal edges of the floor 11. The sides 12, 13 have upper channel edges, such as is shown at 14, which gives longitudinal strength to those sides. The box 10 is carried on a pair of transport wheels, one of which is shown at 15. The box also contains at its rear open end a beater mechanism 16. A rear gate attachment, indicated in its entirety by the reference numeral 20, is provided on the rear end of the spreader box. The gate attachment 20 is composed of a generally upright wall 21 having opposite vertical edges that fit just inwardly of the respective side walls 12, 13. Flexible rubber sealing pads 22, 23 are fixed and extend outwardly from the respective edges of the wall 21. Similarly, rubber flexible pads 24 are fixed to the lower transverse edge of the wall 21 and are inclined forwardly in the box. The pads 22–24 tend to seal a more liquid-type material in the box when the gate 21 is in its lowermost position. Fixed to the opposite upper corners of wall 21 and projecting forwardly therefrom is a pair of support arms 25, 26. The arms 25, 26 are composed of a downwardly opening U-shaped channel which has lower horizontal edges 27, 28 that define the lower extremities of transversely spaced walls 29, 30 and 31, 32.

Figure 2:
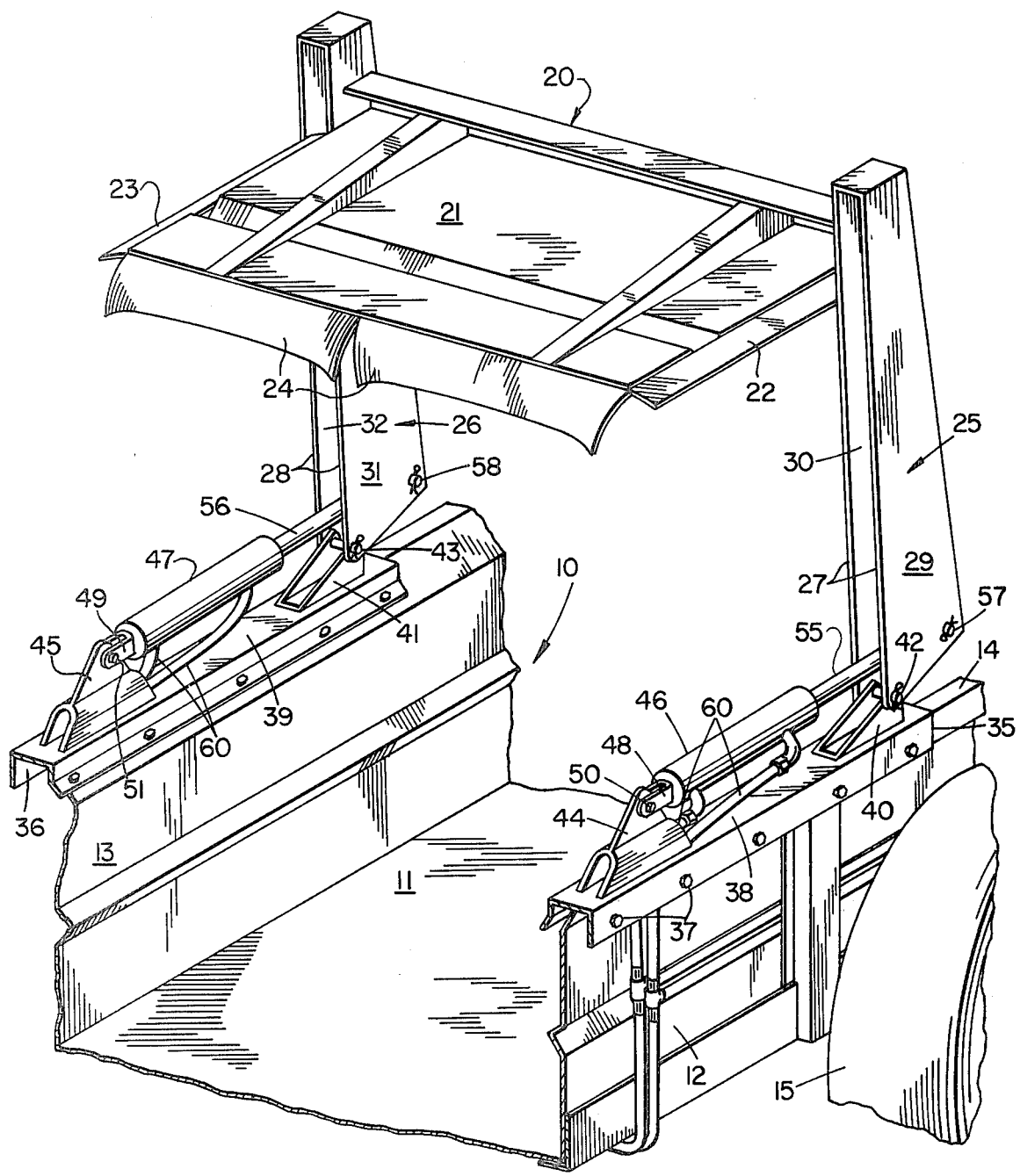
FIG. 2 is a perspective view taken from the right side of the spreader and looking forwardly showing a portion of the spreader and the end gate attachment.

A pair of downwardly opening U-shaped channels 35, 36 fit over the respective upper edges of the sides 12, 13 and are bolted, as at 37, to the respective channel portions, one of which is shown at 14. As will become apparent, the entire gate structure is mounted on the respective channel supports 35, 36 and consequently the entire gate may be attached or removed as desired. The bit portions of the respective channel supports 35, 36 have horizontally disposed flat surfaces 38, 39. A pair of brackets 40, 41 are welded to the forward ends of the upper surfaces 38, 39 and project upwardly therefrom. As is clear from viewing FIG. 2, the brackets 40, 41 are U-shaped in cross section and the respective vertical walls of the channel brackets 40, 41 extend between the walls 29, 30 and 31, 32 of the respective arms 25, 26. A pivot pin 42 extends through the walls 29, 30 and the bracket 40. Similarly, a pivot pin 43 extends through the walls 31, 32 and the bracket 41. The entire gate structure including the arms 25, 26 and the wall 21 may move about the axis of the pivot pins 42, 43 between a down position in which the wall 21 is vertical and inserted between the walls 12, 13 and an upper position, as shown in FIG. 2, in which the wall 21 is generally horizontal and the arms 25, 26 are generally vertical.

Fixed to the rear end portions and welded to the upper surfaces 38, 39 of the channels 35, 36 is a pair of vertical bracket structure 44, 45. As can best be seen from viewing FIG. 2, the respective brackets 44, 45 are Y-shaped in cross section with the fork of the Y facing downwardly and being connected to the channels 35, 36. The stems of the Y-shaped brackets 44, 45 are vertical plates that extend upwardly from the forks. Hydraulic cylinders 46, 47 have yoke elements 48, 49 fixed to and extending rearwardly from the cylinders. The leg portions of the respective yokes extend on opposite sides of the vertical portion of the brackets 44, 45. Pivot pins 50, 51 connect the yoke elements 48, 49 to the respective brackets 44, 45.

As may best be seen from viewing FIG. 1, the lift arms 25, 26 are triangular shape with the apex of the triangle being generally vertically offset from the pivot pins 42, 43. The rod ends 55, 56 of the respective cylinders 46, 47 connect to the apex portion of the arms 25, 26, such being accomplished by respective pivot pins 57, 58 that are in radial offset relation to the pivot axis of the pins 42, 43. Thus, as the rods 55, 56 extend and retract in the respect cylinders 46, 47, the arms 25, 26 and the wall 21 are raised and lowered respectively.

Fluid for operating the cylinders 46, 47 is supplied through conduits, such as at 60, in standard manner. It is to be understood, however, that the conduits 60 extend through the upper walls 38, 39 of the respective channel support members 35, 36 and downwardly through the upper channel edges, such as at 14, of the respective side walls 12, 13. Thus, the conduits 60 are given maximum protection while in the area of the spreader box. Also, the walls 29, 30 and 31, 32 are spaced transversely apart sufficiently that the entire arms 25, 26 can encase the respective cylinders 46, 47 when the gate is in its down position. Also, the flat wall surfaces 38, 39 generally close the underside of the arms 25, 26 when they are in their down position thereby preventing entrance of materials when the spreader is being loaded. Thus, when the spreader is being loaded, which would occur when the arms 25, 26 are down, the hydraulic cylinders 46, 47 are protected by the respective arms 25, 26 from external damage.

I claim:

1. A gate attachment for blocking material from the area of a beater mechanism at the end of a manure spreader that includes a box with transversely spaced upright sides comprising: a pair of downwardly opening U-shaped channels extending over the upper edges of the respective sides and being detachably fixed thereto, said channels having upper horizontal surfaces; a pair of fore-and-aft spaced brackets extending upwardly from each of the respective surfaces; a pair of upright fore-and-aft extending triangular shaped arms pivotally mounted at their forward ends on the respective front brackets of the pair of fore-and-aft spaced brackets to swing vertically between raised and lowered positions, said arms being respectively U-shaped in cross section and closed at their upper edges and with the respective lower edges of the arms opening downwardly and being horizontal and in substantial engagement with said surfaces when the arms are in their lower positions, and each of said arms having opposite transversely spaced sides positioned respectively on opposite sides of the fore-and-aft spaced brackets; and a pair of hydraulic cylinders mounted on the rear of the respective fore-and-aft spaced brackets at a level above the lower edges of the respective arms when the arms are in their lower positions, said cylinders extending therefrom between the sides of said arms and connected to the arms in radially offset relation with respect to the pivotal connection between the front brackets and the respective arms; and a vertical wall extending between the mounted on the rear portions of said arms so as to depend therefrom in blocking relation to the beater mechanism when said arms are in their lower positions.

2. The invention defined in claim 1 in which the triangular shaped arms have upper apex portions as viewed from the sides thereof when the arms are in lower positions, and the hydraulic cylinders are connected to the arms at the upper apex portions.

3. The invention defined in claim 2 in which said apex portions are vertically offset and substantially vertically aligned with the pivotal mounting of the forward ends of the front brackets with the arms.

4. A gate attachment for blocking material from the open rear end of a manure spreader that includes a box with transversely spaced upright sides having upper edges comprising: a pair of fore-and-aft spaced brackets extending upwardly from the upper edges of each of the respective sides; a pair of upright fore-and-aft extending arms mounted by pivotal connections at their forward ends on the respective front brackets of the pair of fore-and-aft spaced brackets to swing vertically between raised and lowered positions, each arm being U-shaped in cross section and closed at their upper edges and with the respective lower edges of the arms opening downwardly and in substantial engagement with said upper edges of the respective sides when the arms in their lower positions, and each of said arms having opposite transversely spaced sides positioned respectively on opposite sides of the fore-and-aft spaced brackets; and a pair of hydraulic cylinders mounted on the rear of the respective fore-and-aft spaced brackets at a level above the lower edges of the arms when the latter are in their lower positions and extending therefrom between the sides of said arms and connected thereto in radially offset relation with respect to the pivotal connection between the fron brackets and the respective arms; and a vertical wall extending between and mounted on the rear portions of said arms so as to depend therefrom so as to block passage of material through said open rear end when said arms are in their lower positions.

* * * * *

UNITED STATES PATENT OFFICE
CERTIFICATE OF CORRECTION

Patent No. 4,212,427　　　　　Dated 15 July 1980

Inventor(s) Rodger B. Grant

It is certified that error appears in the above-identified patent and that said Letters Patent are hereby corrected as shown below:

Column 4, line 46, after "arms" first occurrence insert -- are --; line 55, delete "fron" and insert -- front --.

Signed and Sealed this

Twenty-eighth Day of October 1980

[SEAL]

Attest:

SIDNEY A. DIAMOND

Attesting Officer　　　Commissioner of Patents and Trademarks